United States Patent [19]

Condrac

[11] Patent Number: 4,514,643
[45] Date of Patent: Apr. 30, 1985

[54] PARALLEL VALVE ROTARY MACHINE CONTROL SYSTEM

[75] Inventor: Edward J. Condrac, North Huntingdon, Pa.

[73] Assignee: Elliott Turbomachinery Co., Inc., Jeannette, Pa.

[21] Appl. No.: 609,903

[22] Filed: May 11, 1984

[51] Int. Cl.³ .............................................. F01D 17/02
[52] U.S. Cl. .................. 290/40 C; 290/40 R
[58] Field of Search .............. 290/40 R, 40 A, 40 C

[56] References Cited

U.S. PATENT DOCUMENTS

| Re. 30,589 | 4/1981 | Park | 290/40 C X |
| 3,981,608 | 9/1976 | Sato et al. | 290/40 R X |
| 4,027,145 | 5/1977 | McDonald et al. | 290/40 R X |
| 4,057,715 | 11/1977 | Jones et al. | 290/40 R X |
| 4,118,935 | 10/1978 | Andersson | 290/40 R X |
| 4,120,159 | 10/1978 | Matsumoto et al. | 290/40 C X |
| 4,439,687 | 3/1984 | Wood et al. | 290/40 A X |

Primary Examiner—S. J. Witkowski
Assistant Examiner—W. E. Duncanson, Jr.
Attorney, Agent, or Firm—Robert P. Hayter

[57] ABSTRACT

A method and apparatus utilizing valves mounted in parallel for controlling fluid flow powering an expander is disclosed. A large slow acting valve and a smaller faster acting valve are combined to obtain the desired control including a damped response. A start-up control based on shaft speed is further disclosed.

11 Claims, 1 Drawing Figure

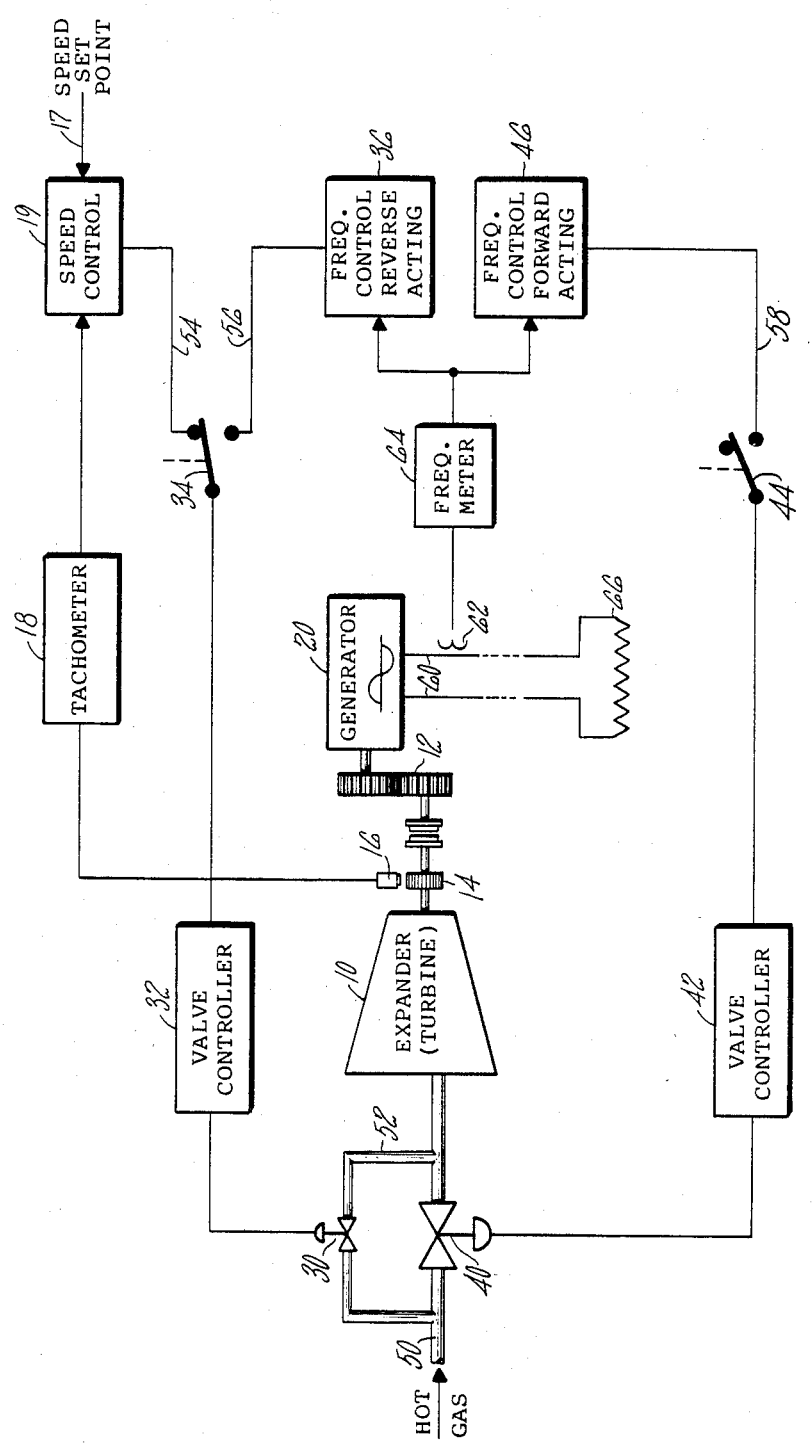

PARALLEL VALVE ROTARY MACHINE CONTROL SYSTEM

BACKGROUND OF THE INVENTION

This invention relates to method and apparatus for effecting control of an expander used to drive a generator for generating electrical power. More specifically this invention concerns controlling the flow of the driving fluid to the expander to effectively regulate the rotational velocity of the generator and consequently the frequency of the electrical power generated.

In many applications hot gas is supplied to a power recovery expander wherein the gas is used to drive the expander generating shaft work. This shaft work is then typically converted to some other type power. In the herein instance this shaft work is utilized to drive a rotary electrical power generator.

Gas expanders may be found in association with the fluid catalytic cracking processes employed in the petroleum industry and are used to recover energy from waste heat gas streams. Other applications include coal gasification and other industrial processes wherein hot gas is generated.

The utilization of hot high energy gas for driving an expander to effectively remove some of the energy contained in the gas is not new. Previous systems have utilized a large fast acting valve to control the flow of gas to the expander to regulate operation of the expander. A valve of this size must be very fast acting to appropriately control the amount of hot gas being supplied to the expander to obtain the desired rotational velocity and to regulate the generator to obtain synchronous electrical power generation. The generator is typically connected to an electrical power grid having other power sources. In a typical electrical power grid alternating current is supplied at a desired frequency such as 60 cycles per second. Hence the expander must be powered to operate at a rotational speed in combination with the generator such that electrical power will also be supplied to the grid from the generator at 60 cycles per second and such that said electrical power will be provided synchronously with the power on the grid.

Controlling the flow of hot gas to the expander utilizing a fast acting control valve has not been fully satisfactory as concerns reliability. A typical valve might be a 52 inch or larger valve and it might require a full stroke of the valve gate between the fully opened and closed positions to occur within less than half a second. A valve of this size having this fast stroke of the gate mechanism is prone to failure and prone to control problems due to the accuracy necessary.

The herein invention concerns the utilization of parallel hot gas conduits to the expander. A first much larger conduit is controlled with a large relatively slow acting valve. A second smaller conduit has a smaller fast acting valve such that the combination of the two valves allows the desired control to be achieved. Additionally by utilizing a relatively slow acting valve with a relatively fast acting valve when one valve tends to overcompensate the other valve tends to undercompensate yielding damped second order response characteristics and allowing for effective overall control of the system.

Additionally a control system may be provided such that the smaller fast acting valve is connected to a reverse active frequency control and such that the larger slow acting valve is connected to a forward acting frequency control such that each valve acts with an opposite bias to create the desired damped response.

SUMMARY OF THE INVENTION

It is an object of the present invention to provide apparatus for effectively controlling the supply of fluid to an expander.

It is a further object of the present invention to provide a method of regulating speed in an expander by controlling the fluid flow thereto.

A still further object of the present invention is to provide control valves for regulating an expander which are durable and effective.

A yet further object of the present invention is to provide apparatus for regulating speed of an expander without requiring a large fast acting valve.

It is a still further object of the present invention to provide a system for controlling the expander using oppositely biased controls for regulating separate valves.

It is another object of the present invention to combine a small fast acting valve with a large slow acting valve to obtain the desired control of an expander.

Other objects will be apparent from the description to follow and the appended claims.

The above objects are achieved according to a preferred embodiment of the invention by a method of controlling a turbine generator set powered by fluid flowing to the turbine. The method includes controlling a portion of the fluid flow to the turbine with a first valve having a relative slow gate movement speed and regulating a portion of the fluid flow to the turbine with a second valve having a relatively fast gate movement speed. The method additionally includes sensing a condition of the generator portion of the turbine generator set and generating a signal in response to a variance between the sensed condition and a reference condition and actuating the steps of controlling and regulating to vary a condition of the turbine generator set in response to the signal generated.

Apparatus for controlling an expander driven by supplying a fluid thereby is additionally disclosed. The apparatus includes a first fluid supply conduit connected to direct fluid to the expander, a first valve mounted to control flow through the first fluid supply conduit and having a relatively slow gate movement, a second fluid supply conduit connected to direct fluid to the expander and being generally parallel with the first fluid supply to the conduit, a second valve mounted to regulate flow through the second supply conduit and having a relatively fast gate movement, means for sensing a condition related to the expander and generating an output in response thereto, and control means for receiving the output and appropriately positioning the first and second valves in response to the output to effect the desired control of the expander.

BRIEF DESCRIPTION OF THE DRAWINGS

FIG. 1 is a schematic view of a turbine generator set including the valve controls.

DESCRIPTION OF THE PREFERRED EMBODIMENT

The invention herein will be described with reference to a turbine generator set being powered by hot gas. It is to be understood that this invention has like applicability to other types of turbomachinery especially to expanders driving other rotating equipment such as a compressor. Additionally this invention would have applicability to a rotary device driven by a liquid as well as a gas or some combination thereof.

The invention will be described in particular relative to the use of two valves having specific response characteristics. The size of the valve and the response characteristics thereof are design choices for a specific application. Additionally the choice of which specific condition of the turbine generator set that shall be monitored to effect control of the expander is also up to the system designer. Herein monitoring of the frequency of the power generated to achieve synchronous operation with an existing electrical power grid is disclosed.

Referring specifically to the FIGURE it may be seen that expander 10 is connected to receive hot gas through conduits 50 and 52. Expander 10 receives the hot pressurized gas and converts some of the energy therein into rotating shaft work. The gas is discharged from the expander at lower temperature and pressure. Turbine 10 is connected to drive gears 12 which are connected to drive generator 20 for generating electrical power. Tachometer gear 14 is shown mounted to the shaft between expander 10 and gears 12. Sensor 16 connected to tachometer 18 is positioned to determine the rotational shaft speed via tachometer gear 14.

Hot gas being supplied through conduit 50 is diverted such that a portion of gas flows through valve 40 which may be a 52 inch valve which operates at a relatively slow speed such as 3–6 seconds for the valve gate to move its full stroke length. Additionally the gas flows through valve 30 which may be a smaller valve such as a 10 inch valve having a relatively fast gate speed such as one quarter to one half second for full stroke of the valve gate. Both valves are connected to regulate the gas flow through line 52 directly to expander 10.

Generator 20 generates electrical power which is conducted over wires 60 to electrical power grid 66. Sensor 62 is mounted relative to wires 60 for determining the frequency of the power being generated. Frequency meter 64 is connected to sensor 62 and acts to generate a signal in response to the variance between the frequency detected by sensor 62 and the desired frequency. A signal from frequency meter 64 is directed to reverse acting frequency control 36 and forward acting frequency control 46. Forward acting frequency control 46 is connected via wire 58 through switch 44 to valve controller 42. Valve controller 42 is connected to regulate the position of valve 40. In like fashion reverse acting frequency control 36 is connected to wire 56 which is connected through switch 34 to valve controller 32. Valve controller 32 acts to position valve 30 for effecting control of gas flowing through conduit 52. The schematic as shown provides reverse acting frequency control through valve 30 and forward acting frequency control through valve 40. Since the slower valve 40 will tend to overcompensate during load changes and the faster valve 30 will tend to undercompensate during load changes the combination of the two should provide second order response damped characteristics allowing for effective speed control of the expander.

Tachometer 18 connected to sense the rotating shaft speed of the expander through tachometer gear 14 and sensor 16 is connected to supply a signal to speed control 19. Speed set point 17 is also supplied to speed control 19. Wire 54 from speed control 19 acts through relay switch 34 to also control valve controller 32 for positioning valve 30. Relay switch 34 is shown in the position wherein speed control 19 is effectively controlling valve 30 and wherein both the forward and reverse acting frequency controllers 36 and 46 are not connected to control either valve. In the mode of operation as shown the faster smaller valve is the only valve utilized to affect speed control of the expander. As shown the unit is in a start-up mode of operation with control of expander being based on rotational speed as detected by the tachometer control. Once the expander reaches the desired speed set point as determined by input 17, then switches 34 and 44 which are commonly connected, are switched such that control of the expander is no longer based upon tachometer 18 but is changed to frequency sensor 62 acting through the frequency meter 64 and the forward and reverse acting frequency controllers 36 and 46. Hence the expander is brought up to speed under no load conditions using tachometer 18 and is thereafter switched to a control based upon a frequency detected in comparison to the existing frequency in the power grid.

The utilization of a small valve having a fast stroke in combination with a large valve having a slow stroke allows for a reliable valve system to be provided. A smaller valve having a fast stroke is more reliable than a large valve having a fast stroke. Additionally a large valve having a slow stroke is much more reliable than a larger valve having a fast stroke. Hence the combination of two valves each being much more reliable than a large valve having a fast stroke acts to provide a highly reliable valve system. Also by providing multiple valves the smaller fast valve may be utilized to achieve the necessary speed control under start-up conditions. Additionally under full load conditions and changes thereto the combination of the valves may provide damped second order response characteristics allowing for very effective overall speed control.

The invention herein has been described with reference to a particular embodiment. It is to be understood by those skilled in the art that variations and modifications can be effected within the spirit and scope of the invention.

I claim:

1. A method of controlling a turbine generator set powered by a fluid flowing to the turbine which comprises the steps of:

controlling a portion of the fluid flow to the turbine with a first valve having a relatively slow gate movement speed;

regulating a portion of the fluid flow to the turbine with a second valve having a relatively fast gate movement speed;

sensing a condition of the generator portion of the turbine generator set and generating a signal in response to a variance between the sensed condition and a reference condition; and actuating the steps of controlling and regulating to vary a condition of the motor generator set in response to the signal generated.

2. The method as set forth in claim 1 wherein the step of controlling includes the first valve controlling the bulk of the fluid flow to the turbine and wherein the step of regulating includes the second valve regulating the balance of the flow to the turbine such that all of the flow is through either the first valve or the second valve.

3. The method as set forth in claim 1 wherein the step of sensing further comprises the step of:
   detecting the frequency of the electric power supplied by the generator; and
   wherein the step of sensing further includes comparing the frequency detected to the desired frequency; and
   wherein the step of actuating further comprises energizing the step of controlling to vary flow by controlling the position of the valve in response to the signal generated by the step of sensing indicating a need for forward acting frequency control.

4. The method as set forth in claim 3 wherein the step of actuating further comprises energizing the step of regulating to vary the flow of fluid to the turbine by regulating the position of the second valve in response to the signal generated by the step of sensing indicating a need for reverse acting frequency control.

5. The method as set forth in claim 1 and further comprising the steps of:
   ascertaining the rotational speed of the shaft; and
   starting the turbine generator set using the step of regulating with the second valve wherein the step of regulating is contolled in response to the speed detected by the step of ascertaining.

6. The method as set forth in claim 5 and further comprising the step of:
   switching the condition from which the step of regulating is controlled when the turbine generator set reaches the desired speed.

7. Apparatus for controlling an expander driven by supplying a fluid thereto which comprises:
   a first fluid supply conduit connected to direct fluid to the expander;
   a first valve mounted to control flow through the first fluid supply conduit and having a relatively slow gate movement;
   a second fluid supply conduit connected to direct fluid to the expander and being generally parallel with the first fluid supply conduit;
   a second valve mounted to regulate flow through the second supply conduit and having a relatively fast gate movement;
   means for sensing a condition related to the expander and generating an output in response thereto; and
   control means for receiving the output and appropriately positioning the first and second valves in response thereto to effect the desired control of the expander.

8. The apparatus as set forth in claim 7 wherein the control means further comprises:
   a reverse acting means connected to energize the second valve and a forward acting means connected to energize the first valve and wherein the second valve is significantly smaller than the first valve such that most of the fluid flowing to the expander flows through the first conduit controlled by the first valve.

9. The apparatus as set forth in claim 8 and further comprising:
   tachometer means for measuring the rotational speed of the expander; and
   start-up regulation means connected to position the second valve to control the speed of the expander in response to the tachometer means during start-up.

10. The apparatus as set forth in claim 9 and further comprising:
    switch means connected to transfer control of the second valve between the start-up regulation means and the control means.

11. The apparatus as set forth in claim 8 wherein the expander is a turbine connected to power an electricity generator and wherein the means for sensing senses the frequency of the current generated by the generator.

* * * * *